US012483562B1

(12) United States Patent
Lowe et al.

(10) Patent No.: US 12,483,562 B1
(45) Date of Patent: Nov. 25, 2025

(54) DETECTING MATCHING CLIENT DEVICES BASED ON LOCATION DATA

(71) Applicant: Maplebear Inc., San Francisco, CA (US)

(72) Inventors: Karen Kraemer Lowe, Los Altos, CA (US); Robert Border, Decatur, GA (US); Lingling Zhang, Atlanta, GA (US)

(73) Assignee: Maplebear Inc., San Francisco, CA (US)

( * ) Notice: Subject to any disclaimer, the term of this patent is extended or adjusted under 35 U.S.C. 154(b) by 39 days.

(21) Appl. No.: 18/662,689

(22) Filed: May 13, 2024

(51) Int. Cl.
*H04L 9/40* (2022.01)
*H04W 12/12* (2021.01)

(52) U.S. Cl.
CPC .......... *H04L 63/107* (2013.01); *H04W 12/12* (2013.01)

(58) Field of Classification Search
CPC ............................ H04L 63/107; H04W 12/12
USPC .............................................................. 726/4
See application file for complete search history.

(56) References Cited

U.S. PATENT DOCUMENTS

2010/0255857 A1* 10/2010 Corem ................ G06F 16/9537 455/456.1
2016/0224901 A1* 8/2016 Scarr ...................... G06N 5/048
2017/0006432 A1* 1/2017 O'Sullivan ............. H04W 4/02
2017/0111226 A1* 4/2017 Zhou ..................... H04L 67/535
2018/0338225 A1* 11/2018 Shimizu .................. H04W 4/40
2023/0336564 A1* 10/2023 Danielpour ............ G06N 20/00
2023/0354033 A1* 11/2023 Reeves ............... H04W 12/122

* cited by examiner

*Primary Examiner* — Thanh T Le
(74) *Attorney, Agent, or Firm* — Fenwick & West LLP

(57) ABSTRACT

An online security system identifies matching client devices by comparing location data points acquired during application workflow from different devices. The location data points comprise a location of the device and a timestamp. Identifiable pairs of data points are collated from different devices when they show a device present within a threshold distance or the same geographic region at identical times. The system utilizes a set of matching criteria to decide whether one data set for one device corresponds with a set from another. Verification of the matches allows the system to ascertain the same user is operating both devices and link the user to both devices. This system enhances security by identifying users likely gaining unauthorized access through multiple device usage simultaneously.

19 Claims, 4 Drawing Sheets

DETECTING MATCHING CLIENT DEVICES BASED ON LOCATION DATA

BACKGROUND

Online systems commonly interact with users through client applications operating on the users' client devices. Users may log into the client applications using credentials that they have created with the online system. However, some malicious actors create multiple credentials and use multiple client devices to access the online system at the same time. By using multiple devices at the same time, these malicious actors can gain unauthorized access to services provided by the online system and receive benefits from the system to which they are not otherwise entitled.

SUMMARY

In accordance with one or more aspects of the disclosure, an online system identifies matching client devices by comparing location data points collected by those client devices. An online system collects location data points that include location data for the client devices as the client devices execute an application workflow of the client application. For example, each location data point may describe a Global Navigation Satellite System GNSS location of the client device. Each location data point is also associated with a timestamp that indicates when the location data was collected.

The online system compares location data points collected for different client devices to determine whether multiple client devices are being operated by the same person. For example, the online system may identify matching pairs of location data points between sets of location data points that correspond to different client devices. A matching pair of location data points are two location data points that indicate that two client devices were located within a threshold distance of each other or within the same geographic region at a corresponding timestamp. The online system applies a set of matching criteria to the identified set of matching pairs of location data points to determine whether one set of location data points for one client device matches with a set for another client device. If the sets match, the online system determines that the same user is operating both client devices and associates the same user with both of the client devices.

Where an online system provides location-based services to users, the online system can automatically identify users that are likely to be gaining unauthorized access to the online system by using more than one client device at the same time. Thus, the online system can better ensure the security in which users receive the services of the online system.

DETAILED DESCRIPTION

Figure 1:
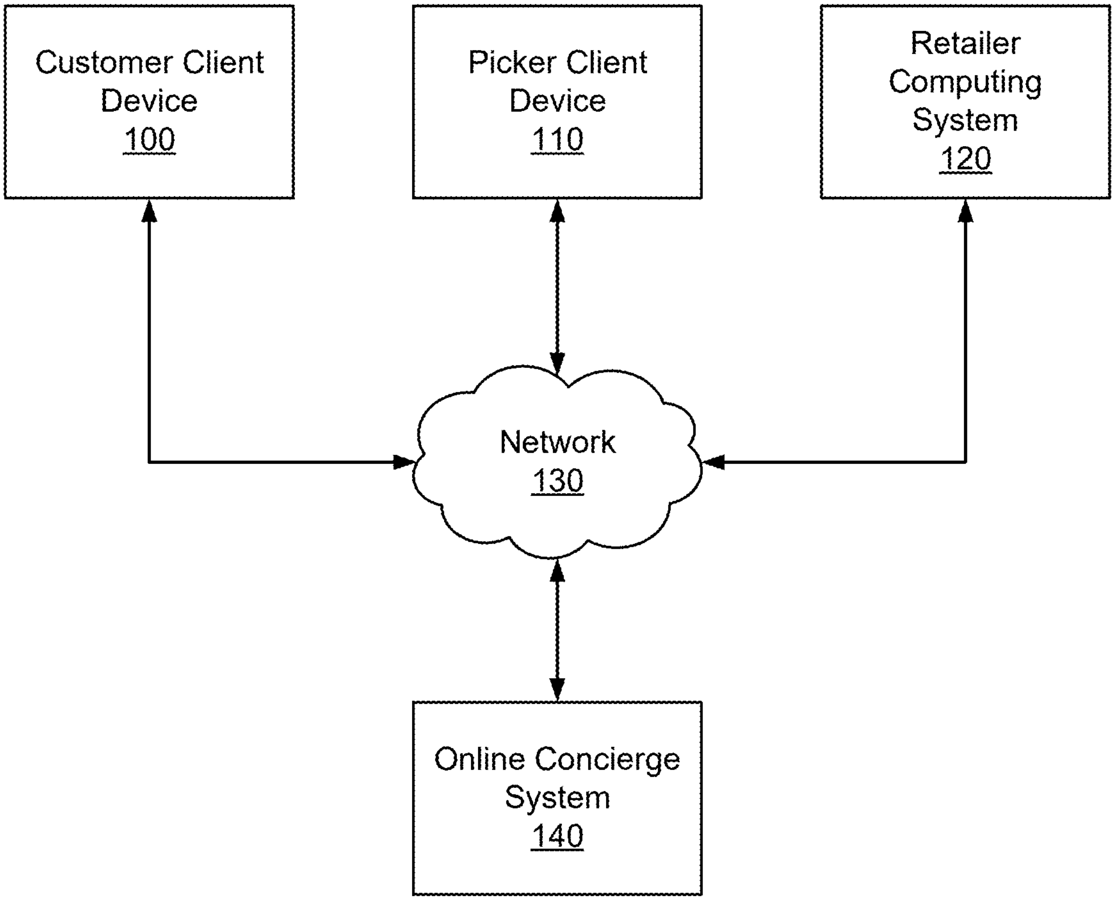
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online system 140. As such, there may be more than one user client device 100, picker client device 110, or retailer computing system 120.

The user client device 100 is a client device through which a user may interact with the picker client device 110, the retailer computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item", as used herein, means a good or product that can be provided to the user through the online system 140. The order may include item identifiers (e.g., a stock keeping unit (SKU) or a price look-up (PLU) code) for items to be delivered to the user and may include quantities of the items to be delivered.

Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a particular retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system

140. Alternatively, the retailer computing system 120 may provide payment to the online system 140 for some portion of the overall cost of a user's order (e.g., as a commission).

The user client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a retailer. The online system 140 receives orders from a user client device 100 through the network 130. The online system 140 selects a picker to service the user's order and transmits the order to a picker client device 110 associated with the picker. The picker collects the ordered items from a retailer location and delivers the ordered items to the user. The online system 140 may charge a user for the order and provide portions of the payment from the user to the picker and the retailer.

As an example, the online system 140 may allow a user to order groceries from a grocery store retailer. The user's order may specify which groceries they want delivered from the grocery store and the quantities of each of the groceries. The user's client device 100 transmits the user's order to the online system 140 and the online system 140 selects a picker to travel to the grocery store retailer location to collect the groceries ordered by the user. Once the picker has collected the groceries ordered by the user, the picker delivers the groceries to a location transmitted to the picker client device 110 by the online system 140. The online system 140 is described in further detail below with regards to FIG. 2.

Figure 2:
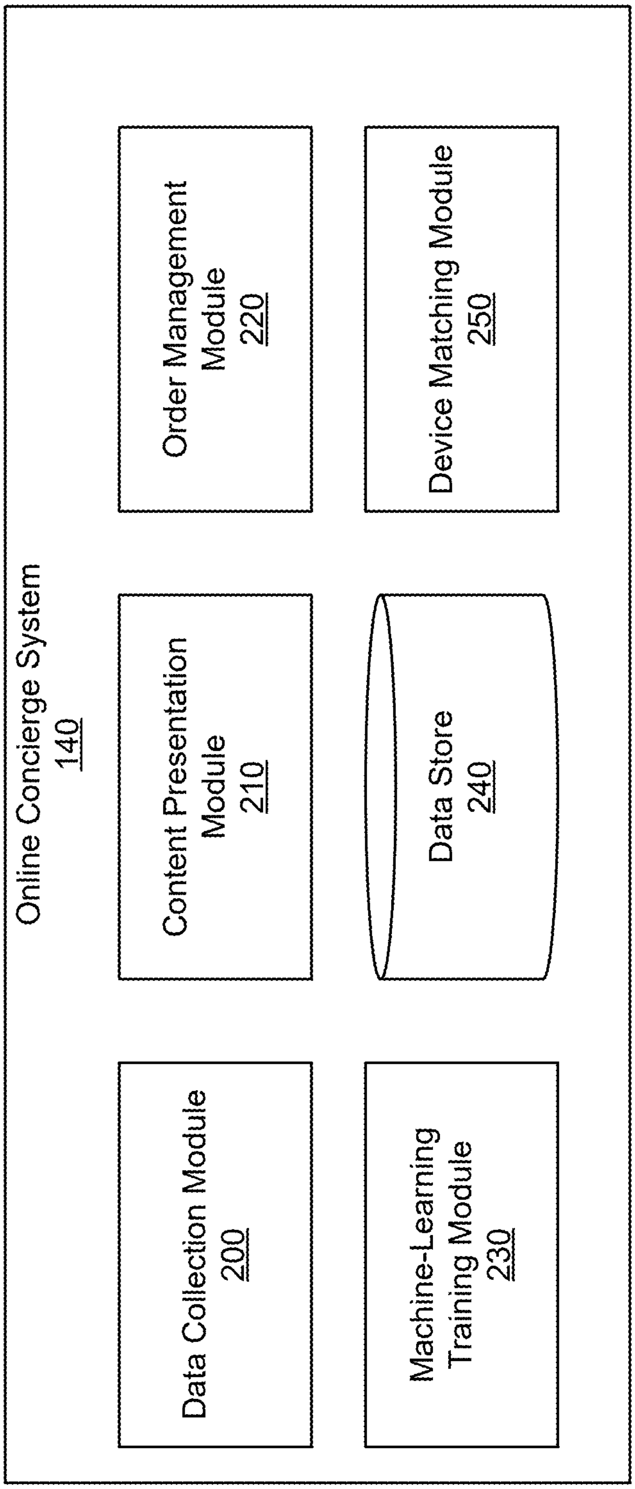
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default retailer/retailer location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The device matching module 250 determines whether a user is servicing multiple batches by using multiple client devices at the same time. As described above, an online system may provide "batches" of orders to a picker to service at the same time. By batching orders for service by the same picker, pickers may be overall more efficient in servicing orders. However, pickers may use multiple client devices to deceive the online system into providing them with more than one batch to service at the same time. Thus, the device matching module 250 identifies whether multiple client devices are being operated by the same user. To identify these cases, the online system receives location data for client devices and determines whether between client devices match each other based on a set of matching criteria. If two client devices match each other, then the device matching module 250 determines that a single user is operating both client devices. More details on example methods for matching devices based on location data is provided below.

The machine-learning training module 230 trains machine-learning models used by the online system 140. The online system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
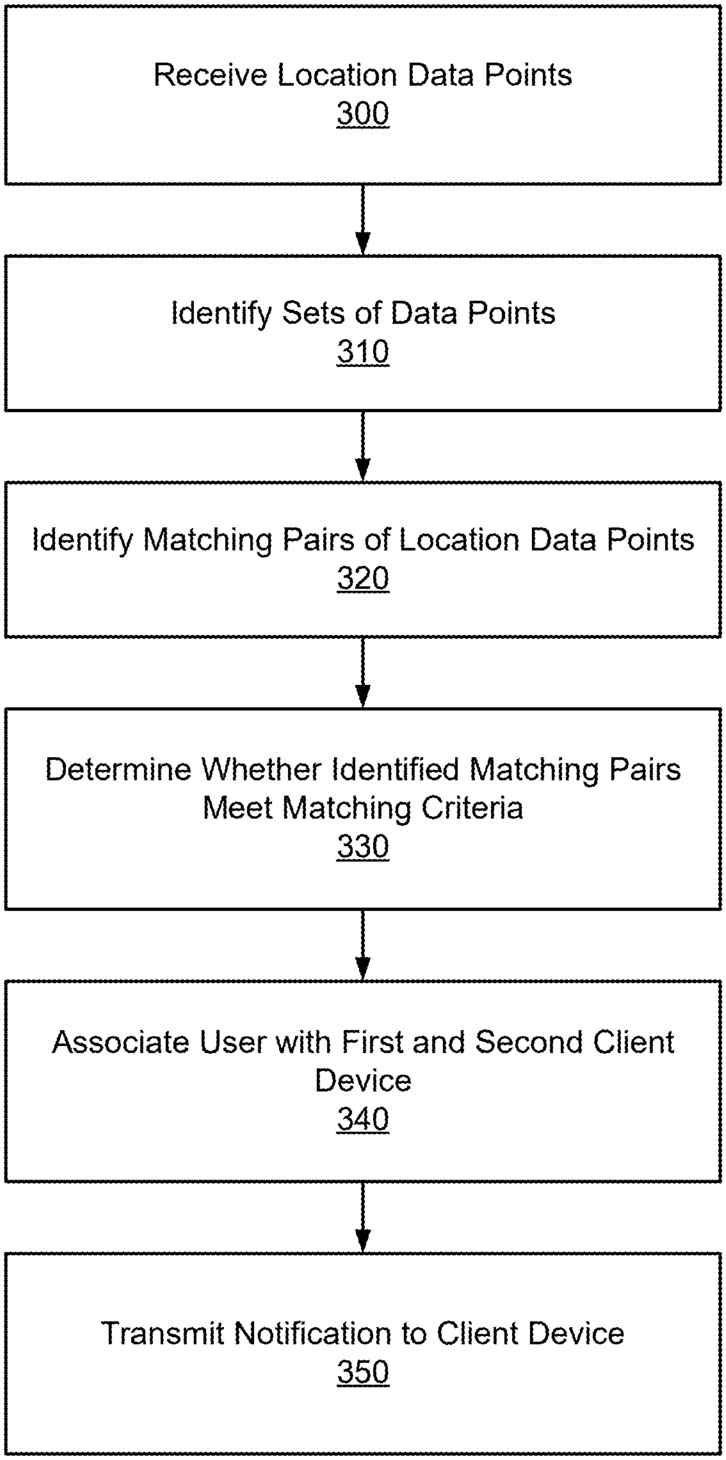
FIG. 3 is a flowchart for a method of identifying client devices that are operated by the same user, in accordance with one or more embodiments.

FIG. 3 is a flowchart for a method of identifying client devices that are operated by the same user, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

The online system receives 300 location data points from a set of client devices. Each location data point includes location data describing a location of a client device. For example, the location data may include GPS location data for the client device. Each location data point also includes a timestamp at which the location data was collected. The timestamp may be a single point in time at which the location data was captured or may be a time range during the location data was captured. The online system captures location data points for each client device over a period of time.

The online system identifies 310 sets of location data points associated with each client device of the set of client devices. Each location data point may include an identifier for the client device that captured the corresponding location data point, and the online system identifies a set of location data points for each client device based on the identifiers.

The online system determines whether a two sets of location data points for different client devices "match." Two sets of location data points match when the location data points in the sets indicate that the client devices are likely to be operated by the same user. For example, if the sets of location data points indicate that the client devices have generally been located at the same locations at the same time over the course of a broader period of time.

Figure 4A:
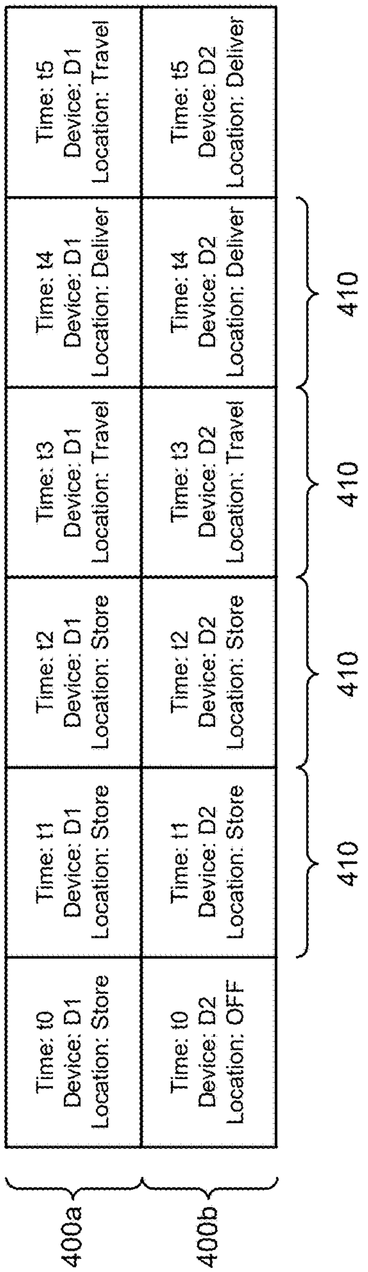
FIGS. 4A and 4B illustrate example matching pairs of location data points, in accordance with one or more embodiments.
Figure 4B:
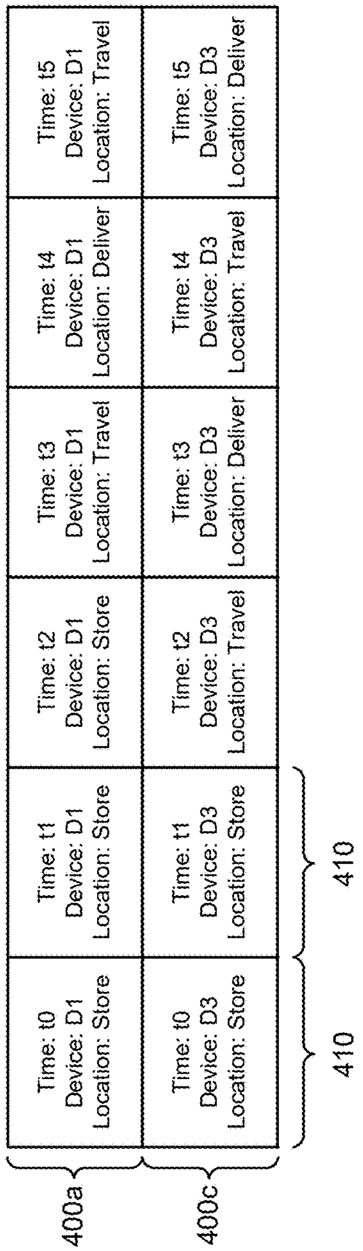

In some embodiments, to determine whether two sets of location data points match, the online system identifies 320 matching pairs between a first set of location data points for a first client device and a second set of location data points for a second client device. A matching pair of location data points are a pair of data points associated with different client devices that are within a threshold distance of each other during a corresponding timestamp. The threshold distance can be a maximum difference in distance between the two location data points during the timestamp. For example, for two location data points to be included in a matching pair, the location data points may have to be within five meters of each other during the same timestamp. The location data points also may be within the same geographical area. For example, the online system may determine whether the location data points are within geographical boundaries or a threshold distance of a retailer location or a delivery location for an order. The online system may use other criteria to identify two location data points as a matching pair. For example, the online system may determine whether the location data points are in the same application workflow state. An application workflow state is a condition or status of a client application operated by the user within the workflow of the client application. For example, example application workflow states include the user collecting items at the retailer location, the user checking out at the retailer location, the user traveling to a delivery location, or the user at the delivery location. The online system may predict the application workflow state based on the location data in the location data point or based on data received from the client application. FIGS. 4A and 4B illustrate example matching pairs of location data points, in accordance with some embodiments. FIG. 4A illustrates example matching pairs between two devices that are operated by the same user. The first set 400*a* of location data points are for a first device D1 and the second set 400*b* are for a second device D2. These sets of location data points have four matching pairs 410*a* of location data points. These location data points indicate that these devices were at the same locations at the same times. Thus, the online system identifies these location data points as matching pairs 410*a*.

FIG. 4B illustrates example matching pairs between two devices that are not operated by the same user. The first set 400*a* of location data points are for a first device D1 and the second set 400*c* are for a third device D3. These sets of location data points have two matching pairs 410*b* of location data points. In other words, while some location data points in the two sets are located at the same store, the rest of the location data points are not at the same location, which indicates that the client devices are operated by different people.

The online system determines 330 whether the first set of location data points match the second set of location data points by determining whether the identified matching pairs meet a set of matching criteria. The matching criteria are criteria for the set of matching pairs of location data points to determine whether the client devices are operated by the same user. The matching criteria may specify threshold values for features of the matching criteria. For example, the matching criteria may include a threshold number of matching location data points in consecutive timestamps, a threshold number of consecutive location data points that are also in the same application workflow state, or a threshold number of transitions between application workflow states. The matching criteria also may include other kinds of criteria. For example, the matching criteria may require that the identified set of matching pairs of location data points include location data points from each set that proceed through the full application workflow of a client application.

In some embodiments, the online system applies a machine-learning algorithm to determine parameters for the matching criteria. For example, the online system may access training data that stores a set of training examples. Each training example includes two sets of location data points and a label indicating whether the client devices corresponding to the two sets of location data points were operated by the same user. The online system may perform an iterative process to generate the parameters for the matching criteria. The online system may initialize the parameters for the matching criteria and apply those initial parameters to the training data. The online system computes performance metrics for the application of those matching criteria parameters to the training data and determines whether the performance metrics meet certain success criteria. For example, the online system may determine how many false positives and negatives were created by the applied matching criteria parameters and compare those values to maxima for those metrics. If performance metrics for the applied matching criteria meet the success criteria, the online system stores the applied parameters to use as the matching criteria for identifying users that are operating multiple client devices. However, if the performance metrics are not met, the online system adjusts the parameters for the matching criteria (e.g., using gradient descent) and applies the adjusted parameters to the training data. The online system iteratively updates the matching criteria parameters until the success criteria are met.

Referring to FIGS. 4A and 4B, the online system may apply matching criteria to the matching pairs 410 identified in the sets 400 of location data points. For example, for matching criteria requiring that the devices be located within some threshold distance of each other or within some geographic region for at least four sequential location data points, the online system may identify the first set 400*a* and the second set 400*b* as matching sets of location data points because they have four matching pairs 410*a* of location data points. Similarly, the first set 400*a* and the third set 400*c* only have two matching pairs 410*b*, so an online system applying that the matching criteria would not identify the sets as matching.

If the online system determines that the identified matching pairs meet the matching criteria, the online system determines that the two sets of location data points match and associates 340 one user with the client devices represented by the sets of location data points. For example, a user may log into a client application operating on each of the client devices that allows the user to service orders from the online system. By logging into the client application, the user associates themselves with a user profile that they created with the online system. However, the user may create different user profiles and use the different user profiles on the different client devices. When the online system determines that the sets of location data points for different client devices match, the online system may associate the user profiles used for the different client devices with each other, thereby associating the user profiles with the same user.

In response to associating the user with the multiple client devices, the online system performs a responding action. For example, the online system may transmit 350 a notification to a client device that has been associated with the user to notify the user that they have been associated with more than one client device. Other example responding actions include rescinding one of the batches from the user, adjusting consideration provided to the user for servicing a batch, transferring a batch from the user to another user, or adjusting which or whether batches are assigned to the user. In some embodiments, the online system selects a responding action to perform based on user data associated with the user. For example, the online system may pick which responding action to perform based on how long the user has been servicing batches for the online system overall, how many devices the user has been operating at the same time, or how many batches the user has serviced using multiple devices at the same time.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality.

Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer-readable medium, comprising:

receiving a set of location data points, wherein each location data point comprises a location of a client device of a set of client devices during a timestamp of a set of timestamps;

identifying a first set of location data points associated with a first client device of the set of client devices;

identifying a second set of location data points associated with the second client device of the set of client devices;

determining whether the first set of location data points matches the second set of location data points by:

identifying matching pairs of location data points, wherein each matching pair comprises a first location data point from the first set of location data points and a second location data point from the second set of location data points, and wherein the location of the first location data point of each matching pair within a threshold distance of the location of the second location data point of the matching pair; and determining whether the identified matching pairs of location data points meet a set of matching criteria;

responsive to determining that the first set of location data points matches the second set of location data points, associating a user with the first client device and the second client device, wherein associating the user with the first client device and the second client device comprises:

associating a user profile used for a client application on the first client device with a user profile for a client application on the second client device; and responsive to associating the user with the first client device and the second client device, transmitting a notification to the first client device for display to the user, wherein the notification alerts the user to the associating.

2. The method of claim 1, wherein each location data point of the set of location data points comprises global navigation satellite system data captured by the corresponding client device.

3. The method of claim 1, wherein each timestamp of the set of timestamps represents a point in time.

4. The method of claim 1, wherein each timestamp of the set of timestamps represents a range of times.

5. The method of claim 1, wherein identifying matching pairs of location data points comprises:

determining whether a first location data points and a second location data point are located within a common geographic region.

6. The method of claim 1, further comprising:

generating the set of matching criteria by applying a machine-learning algorithm to a set of training examples, wherein each training example comprise a first training set of location data points, a second training set of location data points, and a label indicating whether the first and second training sets of location data points match.

7. The method of claim 6, wherein generating the set of matching criteria comprises iteratively:

applying a test set of matching criteria to the set of training examples;

computing a set of success metrics based on the application of the test set of matching criteria;

determining whether the computed set of success metrics meet a success criterion; and responsive to determining that the computed set of success metrics do not meet the success criterion, adjusting the test set of matching criteria.

8. The method of claim 1, wherein the set of matching criteria comprise at least one of a threshold number of matching location data points in consecutive timestamps, a threshold number of consecutive location data points that are also in common application workflow states, or a threshold number of transitions between application workflow states.

9. The method of claim 1, further comprising:

responsive to determining that the first set of location data points matches the second set of location data points, performing a responding action.

10. A non-transitory computer-readable medium storing instructions that, when executed by a processor, cause the processor to perform operations comprising:

receiving a set of location data points, wherein each location data point comprises a location of a client device of a set of client devices during a timestamp of a set of timestamps;

identifying a first set of location data points associated with a first client device of the set of client devices;

identifying a second set of location data points associated with the second client device of the set of client devices;

determining whether the first set of location data points matches the second set of location data points by:

identifying matching pairs of location data points, wherein each matching pair comprises a first location data point from the first set of location data points and a second location data point from the second set of location data points, and wherein the location of the first location data point of each matching pair within a threshold distance of the location of the second location data point of the matching pair; and determining whether the identified matching pairs of location data points meet a set of matching criteria;

responsive to determining that the first set of location data points matches the second set of location data points, associating a user with the first client device and the second client device, wherein associating the user with the first client device and the second client device comprises:

associating a user profile used for a client application on the first client device with a user profile for a client application on the second client device; and responsive to associating the user with the first client device and the second client device, transmitting a notification to the first client device for display to the user, wherein the notification alerts the user to the associating.

11. The computer-readable medium of claim 10, wherein each location data point of the set of location data points comprises global navigation satellite system data captured by the corresponding client device.

12. The computer-readable medium of claim 10, wherein each timestamp of the set of timestamps represents a point in time.

13. The computer-readable medium of claim 10, wherein each timestamp of the set of timestamps represents a range of times.

14. The computer-readable medium of claim 10, wherein identifying matching pairs of location data points comprises:

determining whether a first location data points and a second location data point are located within a common geographic region.

15. The computer-readable medium of claim 10, the operations further comprising:

generating the set of matching criteria by applying a machine-learning algorithm to a set of training examples, wherein each training example comprise a first training set of location data points, a second training set of location data points, and a label indicating whether the first and second training sets of location data points match.

16. The computer-readable medium of claim 15, wherein generating the set of matching criteria comprises iteratively:

applying a test set of matching criteria to the set of training examples;

computing a set of success metrics based on the application of the test set of matching criteria;

determining whether the computed set of success metrics meet a success criterion; and responsive to determining that the computed set of success metrics do not meet the success criterion, adjusting the test set of matching criteria.

17. The computer-readable medium of claim 10, wherein the set of matching criteria comprise at least one of a threshold number of matching location data points in consecutive timestamps, a threshold number of consecutive location data points that are also in common application workflow states, or a threshold number of transitions between application workflow states.

18. The computer-readable medium of claim 10, the operations further comprising:

responsive to determining that the first set of location data points matches the second set of location data points, performing a responding action.

19. A system comprising a processor and a non-transitory computer-readable medium storing instructions that, when executed by the processor, cause the processor to perform operations comprising:

receiving a set of location data points, wherein each location data point comprises a location of a client device of a set of client devices during a timestamp of a set of timestamps;

identifying a first set of location data points associated with a first client device of the set of client devices;

identifying a second set of location data points associated with the second client device of the set of client devices;

determining whether the first set of location data points matches the second set of location data points by:

identifying matching pairs of location data points, wherein each matching pair comprises a first location data point from the first set of location data points and a second location data point from the second set of location data points, and wherein the location of the first location data point of each matching pair within a threshold distance of the location of the second location data point of the matching pair; and determining whether the identified matching pairs of location data points meet a set of matching criteria;

responsive to determining that the first set of location data points matches the second set of location data points, associating a user with the first client device and the second client device, wherein associating the user with the first client device and the second client device comprises:

associating a user profile used for a client application on the first client device with a user profile for a client application on the second client device; and responsive to associating the user with the first client device and the second client device, transmitting a notification to the first client device for display to the user, wherein the notification alerts the user to the associating.

* * * * *